Aug. 29, 1944.   H. N. RIDER   2,357,133
PRESSURE ACTUATED VALVE
Original Filed Nov. 2, 1942
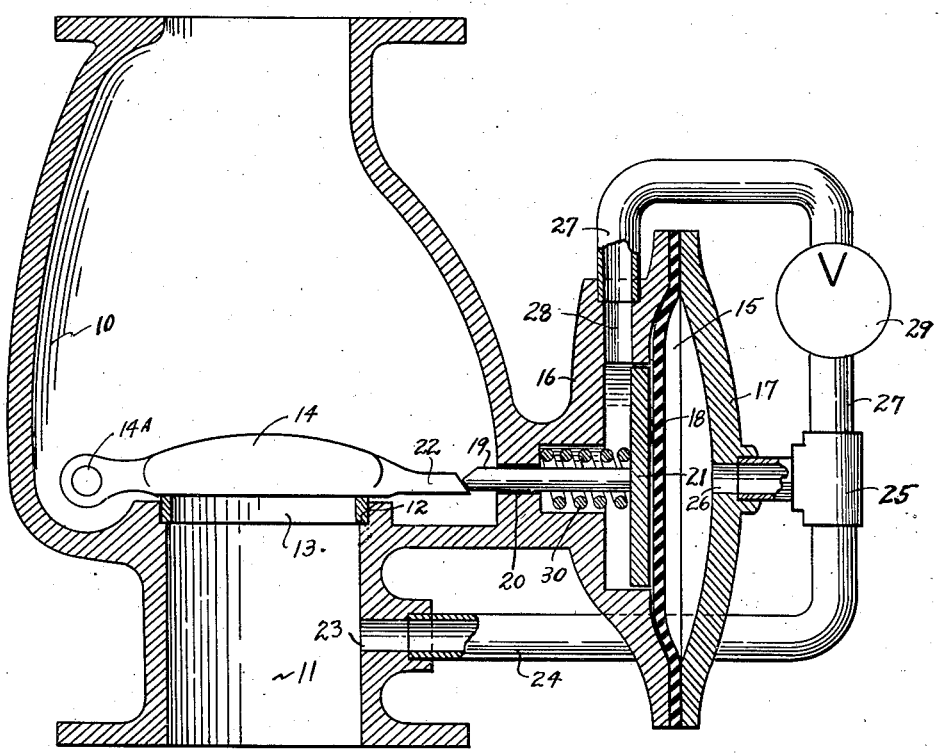
Harry N. Rider
Inventor
By W. B. Harpman
Attorney Patented Aug. 29, 1944

2,357,133

UNITED STATES PATENT OFFICE 2,357,133

PRESSURE ACTUATED VALVE

Harry N. Rider, Youngstown, Ohio, assignor to "Automatic" Sprinkler Company of America, Youngstown, Ohio, a corporation of Delaware Original application November 2, 1942, Serial No. 464,169. Divided and this application March 26, 1943, Serial No. 480,718

4 Claims. (Cl. 169—20)

This invention relates to a control valve and more particularly to a pressure actuated valve adapted for fluid control.

The principal object of the invention is the provision of a pressure actuated valve wherein fluid pressure, the flow of which is controlled by the valve, is utilized to effect such control.

A further object of the invention is the provision of a fluid pressure actuated valve incorporating means for creating and utilizing a differential in fluid pressures for maintaining the said valve in open or closed relation to the fluid passageway therethrough.

A further object of the invention is the provision of a fluid pressure valve wherein fluid pressure controlled by the valve serves to effectively latch a clapper of the said valve in closed position.

A still further object of the invention is the provision of a fluid pressure actuated valve capable of actuation by a valve mechanism such as that shown in my copending application for patent, Serial No. 462,630 filed October 19, 1942.

The fluid pressure actuated valve shown and described herein constitutes an efficient and dependable means of controlling the flow of fluid, primarily fire extinguishing fluid, in a communication line such as a riser of a fire extinguishing system. The pressure actuated control valve is of a type wherein fluid pressure in the line being controlled is utilized to effect the valve operation and in so doing serves to block the flow of fluid through the valve. The valve is adapted to be opened by the by-passing, either manually or automatically, of the fluid pressure from one of the actuating portions of the valve to another portion, which will overcome the differential normally existing and permit the valve to open.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

The figure is a cross sectional side elevation illustrating the pressure actuated valve.

By referring to the drawing, a pressure actuated valve may be seen wherein opening of the valve depends upon the equalization of fluid pressures in the diaphragm chamber which equalization permits a spring to move the latch and unlatch the clapper. The pressure actuated valve will be seen to comprise a valve body 10 formed with a fluid inlet 11 which fluid inlet 11 is separated from the interior of the valve body 10 by means of an annular shoulder 12 carrying a seat ring 13. A clapper 14 is pivoted by means of a pivot pin 14a to the valve body 10 and is adapted to close the passageway between the fluid inlet 11 and the valve body 10. In order that the clapper 14 may be maintained in closed position by fluid pressure within the inlet 11, a diaphragm chamber 15 is formed by and between an extension 16 and a cap 17 at one side of the valve body 10. A diaphragm 18 is positioned across the diaphragm chamber and is held between the cap 17 and the extension 16, so as to divide the diaphragm chamber 15. A latch lever 19 is positioned in and extends loosely through an opening 20 which establishes communication between the interior of the valve body 10 and the interior of the diaphragm chamber 15 but which permits water to pass only very slowly. The latch lever 19 has a piston-like head 21 formed on the outermost end thereof and the other end of the latch lever 19 is beveled and adapted to engage a projection 22 on the clapper 14 of the valve. Fluid pressure in the inlet 11 of the valve is brought into communication with the diaphragm chamber 15 by way of an opening 23 in the side wall of the fluid inlet 11 and by a tube 24 which communicates with a T fitting 25. The T fitting 25 is in direct communication with one side of the diaphragm chamber 15 by way of an opening 26 therein.

The T fitting 25 is also in communication with the diaphragm chamber 15 on the opposite side of the diaphragm 18 by way of a secondary tube 27 which establishes communication with the diaphragm chamber 15 by way of an opening 28. The secondary tube 27 is normally closed by means of a valve symbolically illustrated and indicated by the numeral 29 which valve may constitute a valve release mechanism such as is set forth in the co-pending application for patent, Ser. No. 462,630 filed October 19, 1942, or any other valve known in the art.

The valve 29 is subject to actuation by appropriate means, and forms the actuating device for the fluid pressure valve. When it is in normally closed position, the valve 29 does not interfere with the application of fluid pressure from the inlet 11 to one side of the diaphragm chamber 15 and against the diaphragm 18 so as to move the latch lever 19 against the projection 22 of the clapper 14. The fluid pressure overcomes the tension of a coil spring 30 positioned about the latch lever 19 within an extension of the diaphragm chamber 15. It will thus be seen that pressure in the fluid inlet 11 which is controlled by the closed clapper 14, serves to indirectly hold the clapper 14 in closed position. In order to cause the clapper 14 to open, the valve 29 in the secondary tube 27 is opened either automatically or manually or by a combination of both actions which brings the fluid pressure heretofore present in the tube 24 and the fitting 25 into direct communication with the diaphragm chamber 15 on the opposite side of the diaphragm 18 by way of the opening 28 in the extension portion 16 of the valve body 10 which forms the other half of the diaphragm chamber structure. When this occurs, the fluid pressures being equal upon each side of the diaphragm 18, the diaphragm 18 will immediately assume an intermediate position which will permit the spring 30 to move the latch lever 19 and the piston-like head 21 thereof toward the diaphragm 18 and away from the projection 22 of the clapper 14 which action permits the same to open.

To reset the fluid pressure actuated valve, the subject of this invention, the valve 29 is closed, a gate valve (not shown) controlling the entrance of fluid to the fluid inlet 11 of the fluid pressure valve is closed, the valve body opened by removal of the hand hole cover, and the clapper 14 manually held upon the seat ring 13 while the gate valve (not shown) is opened, thus fluid entering the inlet 11 also enters the diaphragm chamber 15 by way of the opening 26 therein and distends the diaphragm 18, the latch lever 19 is thereby moved outwardly into latching position against the projection 22 of the clapper 14. The hand hole cover is then replaced. The valve is then in condition for re-actuation upon the subsequent opening of the valve 29 in the secondary tube 27.

The valve herein described has features not found in other valves known in the art. For example; the positive unlatching of the clapper 14 is due to the application of fluid pressure to both sides of the diaphragm 18. Further, no exhaust or relief of fluid pressure to the atmosphere is necessary as all of the fluid in the actuating portions of the device is retained within the same.

This application is a division of my co-pending application for patent on Pressure actuated control valve, Serial No. 464,169, filed Nov. 2, 1942.

Having thus described my invention, what I claim is:

1. A pressure actuated valve comprising in combination a valve body having a clapper hinged therein adapted to close a passageway therethrough, pressure actuated means including a diaphragm normally engaging the said clapper so as to retain it in closed position means to release said clapper, means establishing communication between the space on one side of said diaphragm and the inlet portion of the said valve, and means for equalizing fluid pressures on the two sides of the said diaphragm so as to permit the said clapper to open.

2. A pressure actuated valve comprising in combination a valve body having an inlet portion and an outlet portion with a communication channel therebetween, a movably positioned clapper adapted to close the said communication channel, a movable latch member adapted to retain the clapper in closed position, a fluid pressure actuated means including a diaphragm for normally holding the said movable latch member in latched relation to the said clapper, a spring to release the latch member, and means for equalizing fluid pressures on the two sides of the said diaphragm so as to permit the spring to release the said clapper and thereby open the said communication channel.

3. A pressure actuated valve comprising in combination a valve body having an inlet portion and an outlet portion with a communication channel therebetween, a movably positioned hinged clapper adapted to close the said communication channel, a latch adapted to normally retain the clapper in closed position, and fluid pressure actuated means for normally holding the said latch in latched relation to the said clapper, said fluid pressure actuated means comprising a diaphragm in a chamber formed adjacent the said latch, the said diaphragm engaging the said latch so as to move the same against the said clapper, means establishing communication between the said diaphragm chamber on one side of the said diaphragm and the said inlet portion of the said valve so that pressure therein normally holds the said diaphragm against the said latch and the said latch against the said clapper, means to move the said latch away from the said clapper and means including a normally closed valve establishing a communication channel between the said inlet portion and the said chamber on the other side of the said diaphragm.

4. A pressure actuated valve comprising in combination a valve body having an inlet portion and an outlet portion with a communication channel therebetween, a movably positioned clapper adapted to close the said communication channel, a movable latch member adapted to retain the clapper in closed position, means normally urging said latch member away from said clapper, and fluid pressure actuated means including a diaphragm mounted in a chamber for normally holding the said movable latch member in latched relation to the said clapper, means establishing communication between the said inlet portion of the said valve and the said chamber on one side of the said diaphragm, and means for applying fluid pressure to the other side of the said diaphragm so as to cause the said latch to move away from the said clapper and permit the said clapper to open.

HARRY N. RIDER.